United States Patent
Agarwal et al.

(10) Patent No.: US 10,346,439 B2
(45) Date of Patent: Jul. 9, 2019

(54) ENTITY RESOLUTION FROM DOCUMENTS

(71) Applicant: Tata Consultancy Services Limited, Mumbai (IN)

(72) Inventors: Puneet Agarwal, Noida (IN); Gautam Shroff, Gurgaon (IN); Pankaj Malhotra, Noida (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 14/635,709

(22) Filed: Mar. 2, 2015

(65) Prior Publication Data

US 2015/0254329 A1 Sep. 10, 2015

(30) Foreign Application Priority Data

Mar. 6, 2014 (IN) .......................... 770/MUM/2014

(51) Int. Cl.
    *G06F 16/28* (2019.01)
    *G06F 16/27* (2019.01)
    *G06F 16/951* (2019.01)
    *G06F 17/27* (2006.01)
    *G06F 16/215* (2019.01)

(52) U.S. Cl.
    CPC .......... *G06F 16/285* (2019.01); *G06F 16/215* (2019.01); *G06F 16/275* (2019.01); *G06F 16/951* (2019.01); *G06F 17/278* (2013.01)

(58) Field of Classification Search
    None
    See application file for complete search history.

(56) References Cited

U.S. PATENT DOCUMENTS

| 8,533,182 B1 * | 9/2013 | Charboneau ...... G06F 17/30979 707/718 |
| 8,819,078 B2 * | 8/2014 | Roy .................. G06F 17/30073 707/802 |

(Continued)

OTHER PUBLICATIONS

Lars et al., "Dedoop: Efficient Deduplication with Hadoop", 2012, Proceedings of the VLDB Endownment, vol. 5, No. 12, pp. 1878-1881.*

(Continued)

*Primary Examiner* — Usmaan Saeed
*Assistant Examiner* — Katriel Y Chiu
(74) *Attorney, Agent, or Firm* — Banner & Witcoff, Ltd.

(57) ABSTRACT

The present subject matter relates to entity resolution, and in particular, relates to providing an entity resolution from documents. The method comprises obtaining a plurality of documents corresponding to a plurality of entities, from at least one data source. Upon receiving the plurality of documents, the plurality of documents is blocked into at least one bucket based on textual similarity. Further, a graph including a plurality of record vertices and at least one bucket vertex is created. The plurality of record vertices and the at least one bucket vertex are indicative of the plurality of documents and the at least one bucket, respectively. Subsequently, a notification is provided to a user for selecting one of a Bucket-Centric Parallelization (BCP) technique and a Record-Centric Parallelization (RCP) technique for resolving entities from the plurality of documents. Based on the selection, a resolved entity-document for each entity is created.

7 Claims, 4 Drawing Sheets

(56) References Cited

U.S. PATENT DOCUMENTS

| | | | | |
|---|---|---|---|---|
| 9,594,831 B2* | 3/2017 | Wang | ............... | G06F 17/30687 |
| 2002/0055940 A1* | 5/2002 | Elkan | ............... | G06F 17/30867 |
| 2004/0107205 A1* | 6/2004 | Burdick | ........... | G06F 17/30303 |
| 2004/0210763 A1* | 10/2004 | Jonas | ............... | G06F 17/30477 |
| | | | | 713/193 |
| 2006/0031324 A1* | 2/2006 | Chen | .................... | G06Q 10/107 |
| | | | | 709/206 |
| 2011/0119268 A1* | 5/2011 | Rajaram | .......... | G06F 17/30887 |
| | | | | 707/737 |
| 2013/0311467 A1* | 11/2013 | Galle | ................. | G06F 17/2795 |
| | | | | 707/737 |
| 2015/0006564 A1* | 1/2015 | Tomkins | ............ | G06F 17/3064 |
| | | | | 707/767 |

OTHER PUBLICATIONS

Benjelloun et al., "D-Swoosh: A Family of Algorithms for Generic, Distributed Entity Resolution", 2007, 27th International Conference on Distributed Computing Systems (ICDCS'07).*

Malewicz et al., "Pregel: A System for Large-Scale Graph Processing", Jun. 6-11, 2010, Google Inc., pp. 135-145.*

Schelter, Sebastian, "Large Scale Graph Processing with Apache Giraph", May 29th, 2012, Apache.*

Bellare, K., et al. "WOO: A Scalable and Multi-tenant Platform for Continuous Knowledge Base Synthesis", Aug. 2013, pp. 1-12, Proceedings of the VLDB Endowment, vol. 6, No. 11.

* cited by examiner

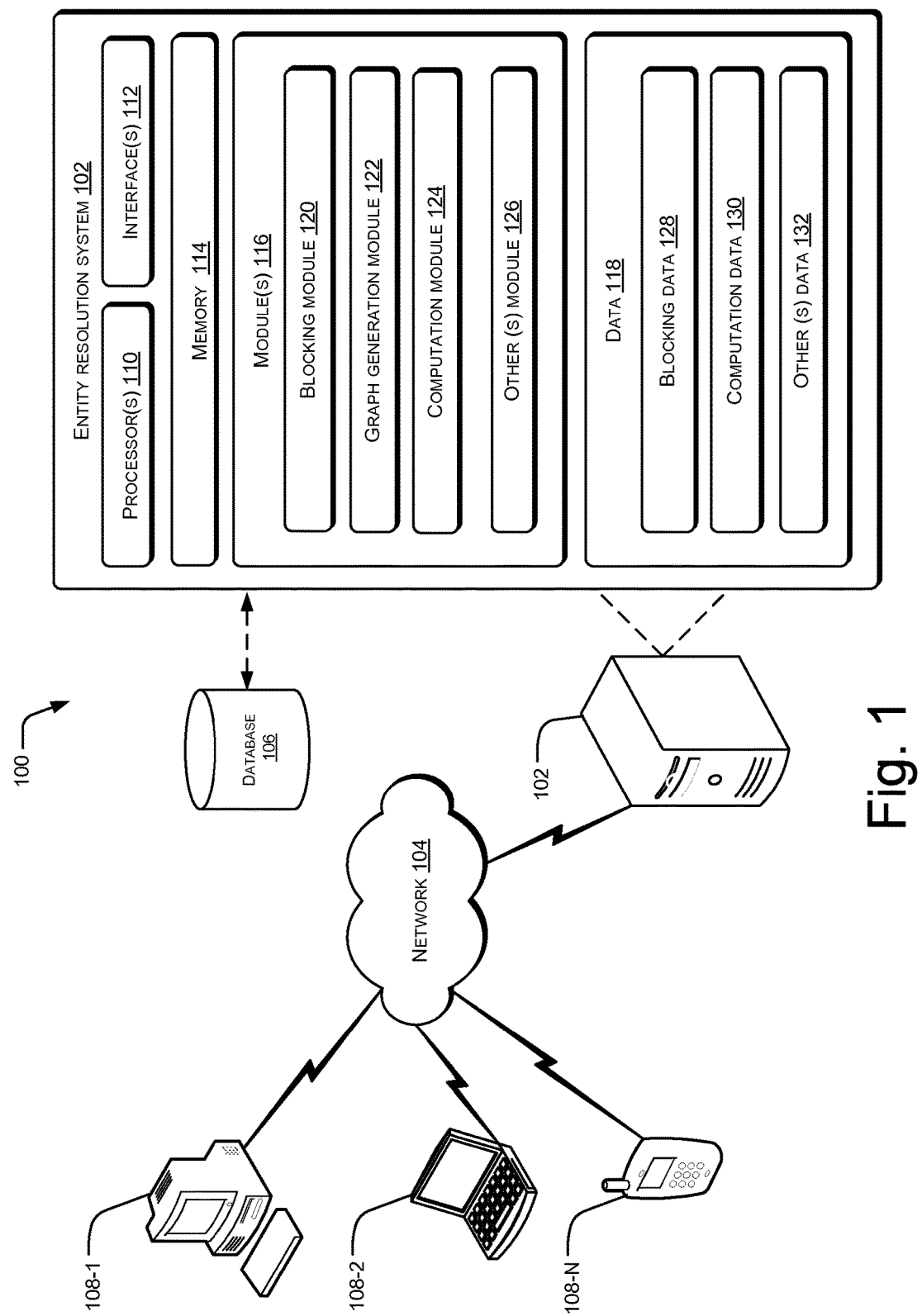

ENTITY RESOLUTION FROM DOCUMENTS

TECHNICAL FIELD

The present subject matter relates, in general, to entity resolution and, particularly but not exclusively, to entity resolution from a plurality of documents.

BACKGROUND

Generally, when data from different sources is analyzed, often multiple records in the data may belong to the same real-world entity, such as a customer, a product or an organization. In order to find different records that belong to the same entity, a technique known as Entity resolution (ER) is widely used. In various disciplines, ER is also referred to as record linkage, de-duplication, co-reference resolution, reference reconciliation, object consolidation, identity uncertainty and database hardening. ER has a wide scope of application, for example, in government and public health data maintenance, web search, e-commerce and law enforcement. In practice, dynamics pertaining to the ER may keep changing, e.g., corresponding data set may keep changing over a period of time. Therefore, in order to accommodate such changes associated with the data, ER has to be performed regularly to update an ER result set of resolved entities.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 1 illustrates a network environment implementing an entity resolution system, in accordance with an embodiment of the present subject matter.

DETAILED DESCRIPTION

Figure 1A:
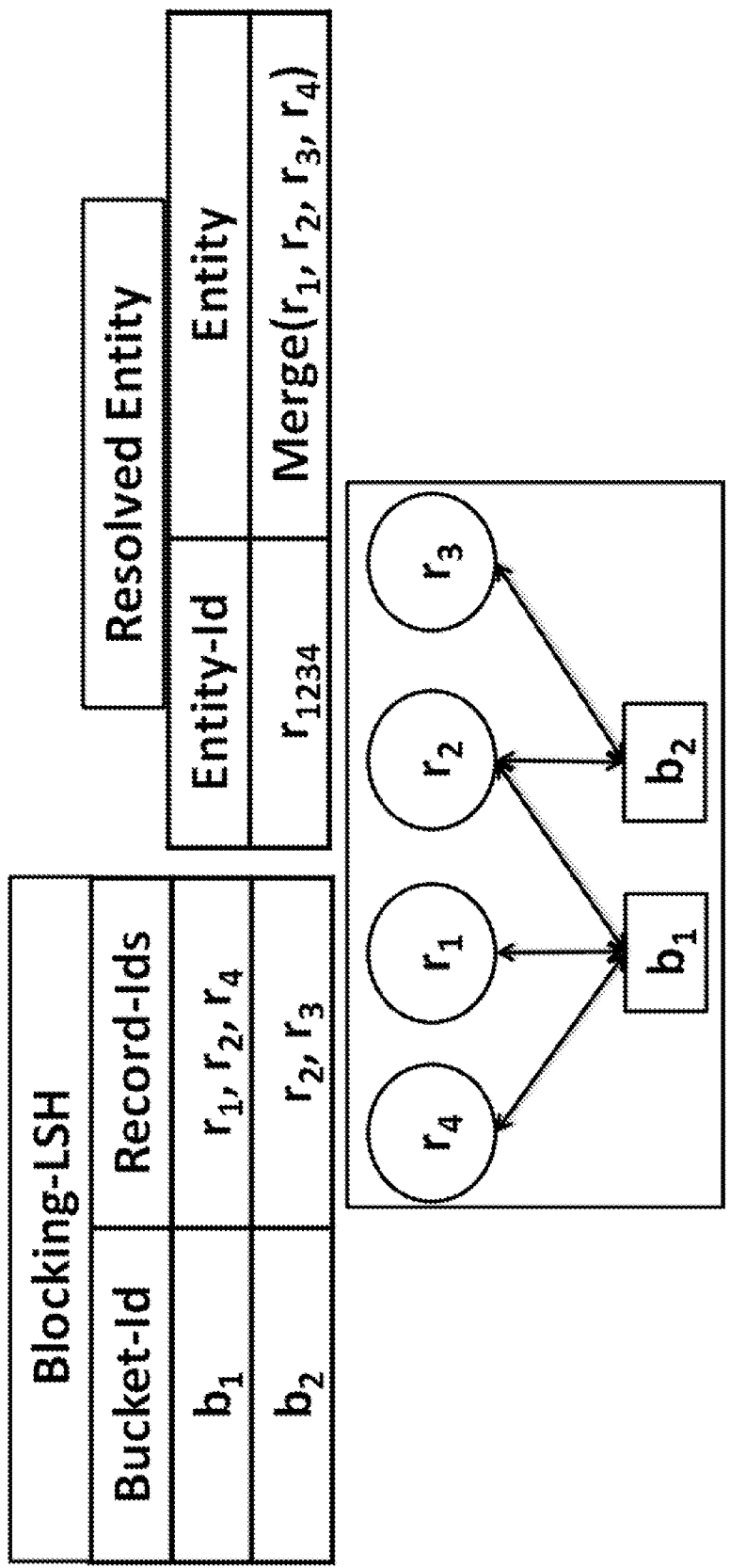
FIG. 1(a) illustrates an example including a plurality of records and a plurality of buckets for entity resolution, in accordance with an embodiment of the present subject matter.

System(s) and method(s) for entity resolution from a plurality of documents are described. The system(s) and method(s) can be implemented in a variety of computing devices, such as laptops, desktops, workstations, tablet-PCs, notebooks, portable computers, tablet computers, internet appliances, and similar systems. However, a person skilled in the art will comprehend that the embodiments of the present subject matter are not limited to any particular computing system, architecture, or application device, as they may be adapted to new computing systems and platforms as they become available.

In the last few decades, Entity Resolution (ER) has emerged as a growing challenge in the realm of data management across industries. Often, multiple records available in various data sources may pertain to the same real-world entity, such as a person, a product, or an organization. To resolve such situations, ER analysis is performed for identifying those records that refer to the same entity and once identified, merging those records. The various records may be interchangeably referred to as documents or textual documents. Therefore, in the ER analysis, a plurality of documents obtained from the various data sources may be matched, in pairs, for determining similarity among the plurality of textual documents. Based on the determination, a set of textual documents related to an entity may be identified, and the identified set of textual documents may then be combined to create a merged document for the entity. As would be understood, the merged document of an entity may include all the details disclosed in each of the identified set of textual documents.

Usually, ER analysis includes a large number of records to be processed in order to resolve the entities involved. For example, in case of a citizen of a country being considered as an entity, the records may include identity proofs, such as a passport, a voter ID, a driving license, a credit card, a Permanent Account Number (PAN), a telephone number, and a bank account number. Considering that each citizen owns an average of 3 of the above-mentioned IDs, the number of records to be processed for resolving entities may turn out to be in millions, or even billions.

In order to make the ER analysis scalable, the conventional ER techniques employ a blocking technique to divide the records in various blocks based on some pre-defined parameters, such as textual similarity. Now, each block may contain a relatively small number of potentially matching textual documents. Thereafter, a pair-wise comparison of the textual documents is performed in each block to identify a set of textual documents pertaining to an entity. In the pair-wise comparison, based on a match function, two textual documents are considered as matching. The match function may include but is not limited to predefined rules, and binary classifiers derived using machine learning. Therefore, based on the match function, a set of textual documents pertaining to each entity may be identified, within each block. The set of textual documents may then be merged to create a merged document for each entity. As may be understood, the merged document contains all the information as disclosed in each of the set of textual documents pertaining to the entity. Therefore, within each block, the textual documents are resolved to entities, and such resolved entities are referred to as partial entities.

However, the conventional blocking techniques may block different textual documents belonging to a single entity into more than one block. In such a case, multiple partial entities belonging to the same entity may be obtained from multiple blocks. Such partial entities from different blocks may be connected by the fact that the partial entities may share the same textual document. Therefore, the textual documents pertaining to each of the pair of the partial entities can be consolidated to form an entity-resolved document for an entity. As would be gathered, an entity-resolved document of an entity may include all the information pertaining to the entity as disclosed in each of the plurality of documents.

As mentioned previously, in the course of resolving the entities from the records, the blocking techniques may result into formation of a plurality of blocks for collection of potentially matching documents. Further, it may happen that a large number of blocks formed are singletons, i.e., blocks including only one textual document. This may indicate that, within a singleton bucket, such textual documents may not have to be further processed or compared with other textual documents. However, the conventional techniques may involve sending a textual document to a singleton block the textual document is blocked to. As would be understood, since no comparisons have to be performed within a singleton block, sending of the textual document to the singleton block is unnecessary. In fact, sending the textual documents to the singleton blocks would result into wastage of resources and time, and therefore, may add to the cost of ER analysis as well. The cost, resource and time wastage would be more in case the documents are large in size, and therefore, may affect the overall economic facet of the ER analysis.

Further, as a result of the execution of the blocking technique, there may be instances where the records may be blocked in a skewed manner, i.e., size of blocks, in terms of number of hashed textual documents, may turn out to be uneven. In case there are more number of blocks, the textual documents may be processed by employing a parallel computation technique. As may be understood, in parallel computation, the blocks can be distributed across multiple processing units for performing the analysis. In such scenarios, time to be utilized for processing the textual documents in a block having more number of textual documents may be disproportionately more than the time to be utilized for a block having less number of textual documents. Therefore, a processing unit with blocks having larger number of textual documents than other blocks may act as a bottleneck for the overall ER analysis, and an overall time required for completion of the ER analysis would be significantly more.

Furthermore, consolidating merged documents to form entity-resolved documents is a complex process as it involves determination of common textual documents shared among partial entities, which is an iterative process. Therefore, time spent and resources used for determining common textual documents are significant. Thus, as is evident, the conventional ER techniques can be time-extensive, inefficient, and expensive.

According to the present subject matter, an entity resolution system, hereinafter referred to as a system, for entity resolution from a plurality of documents is disclosed. In one implementation, the system may obtain the plurality of documents corresponding to a plurality of entities from at least one data source. The plurality of documents may be blocked into at least one bucket, based on textual similarity among the plurality of documents. Further, a graph including a plurality of record vertices and at least one bucket vertex may be created. Subsequent to the generation of the graph, a notification may be provided to a user for selecting one of a Bucket-Centric Parallelization (BCP) technique and a Record-Centric Parallelization (RCP) technique for resolving entities from the plurality of documents. The notification may include but is not limited to a suggestion for selecting one of the BCP technique and the RCP technique based on the blocking of the plurality of documents. Based on the selection by the user, a resolved entity document for each entity may be generated.

In one implementation, the plurality of documents may be interchangeably referred to as records. As is generally understood, records can include tangible objects, such as paper documents, like birth certificates, driver's licenses, and physical medical x-rays, as well as digital information, such as electronic office documents, data in application databases, web site content, and electronic mail (email). Further, the at least one data source may include, but is not limited to, an external database and/or an in-house database. Once the plurality of documents is obtained, a blocking technique, e.g., Locality Sensitive Hashing (LSH) may be employed to block the plurality of documents.

The LSH technique may use hash functions for grouping or blocking the plurality of documents based on textual similarity among the plurality of documents. In one implementation, a unique identification (ID) may be allotted to each of the plurality of documents, and instead of blocking the plurality of documents themselves, unique IDs of the documents may be blocked into the at least one bucket. Further, singletons buckets, i.e., buckets having one document may be discarded, and may not be considered for the further computations of the ER analysis. As would be gathered, blocking of the plurality of documents may facilitate in avoiding undesired comparisons among the plurality of documents.

In one implementation, computations to be performed for the ER analysis may be distributed across multiple processing units. For example, the buckets can be provided to multiple processing units for the subsequent stages of the ER analysis. This would assist in parallel computation for performing ER analysis and therefore, time to be utilized and complexity involved in the ER analysis can be minimized.

Thereafter, a graph including a plurality of record vertices and at least one bucket vertex may be created. The plurality of record vertices and the at least one bucket vertex correspond to the plurality of documents and the at least one bucket, respectively. In other words, each of the plurality of documents and the at least one bucket may be considered as a vertex in the graph. In one implementation, the plurality of record vertices and the at least one bucket vertex may be connected to each other by edges, depending on the blocking of the plurality of documents.

In one implementation, an adjacency list for each record vertex and each bucket vertex may be generated. In one example, the adjacency list of a record vertex may include details of bucket vertices to which the record vertex is hashed to. The adjacency list of a record vertex may hereinafter be referred to as a record adjacency list. Similarly, the adjacency list of a bucket vertex may include details of record vertices hashed to the bucket vertex. The adjacency list of a bucket vertex may hereinafter be referred to as a bucket adjacency list.

Subsequent to the creation of the graph, a notification may be provided to a user for selecting at least one of a Bucket-Centric Parallelization (BCP) technique and a Record-Centric Parallelization (RCP) technique for resolving entities from the graph. In one implementation, the notification may include but is not limited to a suggestion for selecting one of the BCP technique and the RCP technique for resolving the entities from the plurality of documents. In one implementation, the suggestion may be provided based on the blocking of the plurality of documents. For example, in case the blocking of the plurality of documents may result into substantially uniform distribution of the plurality of documents among the buckets, the BCP technique for entity resolution may be provided as the suggestion. On the other hand, in case the plurality of documents is distributed among the buckets in a non-uniform manner, then the RCP technique may be provided as the suggestion. This is due to the fact that the RCP technique may utilize relatively lesser time than the BCP technique for entity resolution in case of non-uniform distribution of the plurality of documents.

Further, in the BCP technique, the plurality of documents may be compared at bucket vertices. On the other hand, in the RCP technique, the plurality of documents may be compared at record vertices. In one implementation, the BCP technique and the RCP technique may be employed using a Pregel-based platform.

In one implementation, the user may select the BCP technique for entity resolution. As mentioned earlier, initially, only IDs of documents hashed to a bucket are available at a corresponding bucket vertex. Therefore, a value, i.e., content of a corresponding document, of each record vertex may be provided to one or more bucket vertices as provided in a record adjacency list. Once each bucket vertex receives values of the record vertices hashed to the bucket vertex, the documents are compared at each bucket vertex. In one implementation, an Iterative Match Merge (IMM) technique may be used for comparing the documents at a bucket vertex. In accordance with the IMM technique, at each bucket vertex, at least one matching pair of documents may be identified and merged to create a merged document for each entity. Entities resolved, at a bucket vertex, by creating merged documents may be referred to as partial entities.

As per the IMM technique, multiple partial entities belonging to the same entity can be obtained from multiple buckets. However, such partial entities may share at least one document, and therefore can be considered to be connected. In order to determine such shared or common or connected documents, for each partial entity, one of the corresponding documents may be considered as a central document, and one or more edges between a corresponding central record vertex and each of the remaining record vertices of the partial entity are created. Similar vertex-edge structures may be created for each partial entity. In case a document is shared by multiple partial entities, the document may appear in the vertex-edge structure of each of the multiple partial entities. In such a case, all the record vertices belonging to the two partial entities may be connected and may be considered to be belonging to the same entity. Therefore, the connected record vertices, i.e., the connected documents can be consolidated to form an entity-resolved document for the entity. As would be gathered, an entity-resolved document of an entity may include all the information pertaining to the entity as disclosed in each of the plurality of documents.

In an alternate implementation, the user may select the RCP technique for entity resolution. In the RCP technique, from each bucket vertex, a comparison message may be provided to one or more record vertices connected to a bucket vertex, in order to schedule comparisons among the plurality of documents using the IMM technique. For example, for each pair of record vertices, a comparison message may be provided to one of the two record vertices, e.g., $\{r_j\}$ is sent to $r_i$, if i<j.

Once a comparison message is received at a record vertex from the at least one bucket vertex, a value of the record vertex may be sent to record vertices whose IDs are received in the comparison message. In case if the two record IDs $r_i$ and $r_j$ co-occur in multiple bucket adjacency lists, the record vertex $r_i$ may receive multiple comparison messages containing record ID $r_j$, one from each bucket vertex. However, the value of the record vertex $r_i$ may be provided to the record vertex $r_j$ only once.

Based on the comparison messages, document corresponding to the plurality of record vertices may be compared using a match function. In one implementation, the match function may include but is not limited to predefined rules, and binary classified derived using machine learning. For example, if a value of a record vertex r matches a value of an incoming comparison message containing an ID of a record vertex r', a match message $\{r, r'\}$ containing IDs of the two matched record vertices may be sent to the record vertex r and the record vertex r'. For example, in case the record vertex r matches m record vertices, the record vertex r may receive m corresponding match messages. Since the record vertex r matches the m record vertices, the m+1 (including r) records may considered to be belonging to the same entity. In such an implementation, at the record-vertex r, pairs of record IDs received as match messages may be consolidated to create a match set containing the m+1 IDs. As would be gathered, a match set is indicative of a set including IDs of record vertices belonging to the same entity. The match set may further be provided to one or more bucket-vertices as defined in a bucket adjacency list of the record-vertex r.

Upon receiving the match sets from connected record vertices, at each bucket-vertex, the match sets may be consolidated to form a consolidated match set. Following the creation of the consolidated match set, older match sets utilized for forming the consolidated match set may be deleted or removed. This is done iteratively till all the match sets are disjoint. Further, new record vertices, hereinafter referred to as partial-entity vertices, for each of such disjoint match sets can be created. In one implementation, bi-directional edges between the partial entity vertices and corresponding buckets vertices may be created. Continuing with the present implementation, a partial-entity ID message may be provided to each record-vertex in order to inform the record-vertices about their corresponding partial-entity ID.

Once the record-vertex r receives a partial-entity ID message containing the ID of a new partial-entity vertex $r_{PE}$, the record-vertex r may provide the value and the record adjacency list as a message, e.g., $\{v_i, e_i\}$, where $v_i$ is the value of the record vertex r and $e_i$ is the record adjacency list, to $r_{PE}$. In continuation with the receipt of values of connected record vertices, a value of the partial-entity vertex $r_{PE}$ may be obtained by merging the received value $v_i$s as received in the message. For every bucket vertex $b_i$, to which the partial-entity record vertex $r_{PE}$ is added, the partial-entity record vertex $r_{PE}$ may be compared with the other documents and partial entities in a bucket adjacency list of $b_i$. In one implementation, the partial-entity vertices may be treated like record vertices for next iteration of the above-mentioned steps. Finally, each record vertex, which formed the partial-entity vertex $r_{PE}$ can be deleted. Such iterations may be performed until no messages are further created.

As would be gathered, after the blocking of the plurality of documents, providing IDs of the documents to the buckets instead of providing the documents themselves assists in reducing communication cost and data traffic during the ER analysis. Further, removal of singleton buckets in the early stages assists in avoiding unnecessary transmission of textual documents to singleton buckets. Eventually, this would lead to optimal utilization of resources, time and cost associated with transmission of data for the ER analysis. In addition, the RCP technique for ER analysis distributes the IMM computations for documents, mapped to the same bucket, to the record vertices. Therefore, the load of large IMM computations at bucket vertices is further parallelized. As a result, the computations are better balanced even when record vertices are randomly distributed across processors. Due to the balanced computations employed by the present subject matter, the present subject matter is apt for ER analysis involving billions of records and hundreds of millions of entities. All the above-mentioned advantages lead to optimum utilization of time and resources, which would facilitate in reducing the cost involved as well. Therefore, the entity resolution system of the present subject matter provides a comprehensive and exhaustive approach for a time-saving, accurate, and inexpensive ER analysis.

These and other advantages of the present subject matter would be described in greater detail in conjunction with the following figures. While aspects of described system(s) and method(s) for entity resolution from documents can be implemented in any number of different computing systems, environments, and/or configurations, the embodiments are described in the context of the following exemplary system(s).

FIG. 1 illustrates a network environment 100 implementing an entity resolution system 102, also referred to as system 102, according to an embodiment of the present subject matter. In the network environment 100, the system 102 is connected to a network 104. Further, the system 102 is connected to a database 106. Additionally, the network environment 100 includes one or more user devices 108-1, 108-2 . . . 108-N, collectively referred to as user devices 108 and individually referred to as user device 108, connected to the network 104.

The system 102 can be implemented as any set of computing devices connected to the network 104. For instance, the system 102 may be implemented as workstations, personal computers, desktop computers, multiprocessor systems, laptops, network computers, minicomputers, servers, and the like. In addition, the system 102 may include multiple servers to perform mirrored tasks for users.

Furthermore, the system 102 can be connected to the user devices 108 through the network 104. Examples of the user devices 108 include, but are not limited to personal computers, desktop computers, smart phones, PDAs, and laptops. Communication links between the user devices 108 and the system 102 are enabled through various forms of connections, for example, via dial-up modem connections, cable links, digital subscriber lines (DSL), wireless or satellite links, or any other suitable form of communication.

Moreover, the network 104 may be a wireless network, a wired network, or a combination thereof. The network 104 can also be an individual network or a collection of many such individual networks interconnected with each other and functioning as a single large network, e.g., the internet or an intranet. The network 104 can be implemented as one of the different types of networks, such as intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 104 may include network devices, such as network switches, hubs, routers, host bus adapters (HBAs), for providing a link between the system 102 and the user devices 108. The network devices within the network 104 may interact with the system 102 and the user devices 108 through communication links.

In said embodiment, the system 102 includes one or more processor(s) 110, interface(s) 112, and a memory 114 coupled to the processor 110. The processor 110 can be a single processing unit or a number of units, all of which could also include multiple computing units. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions and data stored in the memory 114.

The interfaces 112 may include a variety of software and hardware interfaces, for example, interface for peripheral device(s), such as a keyboard, a mouse, an external memory, and a printer. Further, the interfaces 112 may enable the system 102 to communicate with other computing devices, such as web servers, and external data repositories, such as the database 106, in the network environment 100. The interfaces 112 may facilitate multiple communications within a wide variety of protocols and networks, such as the network 104, including wired networks, e.g., LAN, cable, etc., and wireless networks, e.g., WLAN, cellular, satellite, etc. The interfaces 112 may include one or more ports for connecting the system 102 to a number of computing devices.

The memory 114 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The non-transitory computer-readable medium, however, excludes a transitory, propagating signal.

The system 102 also includes module(s) 116 and data 118. The module(s) 116 include routines, programs, objects, components, data structures, etc., which perform particular tasks or implement particular abstract data types. In one implementation, the module(s) 116 include a blocking module 120, a graph generation module 122, a computation module 124 and other module(s) 126. The other module(s) 126 may include programs or coded instructions that supplement applications and functions of the system 102.

On the other hand, the data 118 inter alia serves as a repository for storing data processed, received, and generated by one or more of the module(s) 116. The data 118 includes, for example, blocking data 128, computation data 130, and other data 132. The other data 132 includes data generated as a result of the execution of one or more modules in the module(s) 116.

In one implementation, the system 102 may resolve entities from a plurality of documents, which may be interchangeably referred to as records. As is generally understood, records can include tangible objects, such as paper documents like birth certificates, driver's licenses, and physical medical x-rays, as well as digital information, such as electronic office documents, data in application databases, web site content, and electronic mail (email). For this, in one implementation, the blocking module 120 may obtain the plurality of documents from at least one data source. Each of the plurality of documents may pertain to a real-world entity, e.g., a person, a product or an organization. Generally, the plurality of documents may exist in form of textual documents, and may include at least one attribute. For example, a passport may have attributes, such as name, father's name, address, data-of-birth and contact number.

Once the plurality of documents is obtained, the blocking module 120 may utilize a blocking technique for blocking the plurality of documents. In one implementation, the Map Reduce (MR) technique can be utilized for blocking the plurality of documents using a Locality Sensitive Hashing (LSH) technique. The LSH technique may utilize hash functions for blocking the plurality of documents into one or more buckets based on textual similarity among the plurality of documents. In one implementation, the blocking module 120 may hash the plurality of documents with bucket IDs.

Therefore, documents with high textual similarity are likely to get at least one same hash-value, i.e., same bucket ID. On the other hand, documents, which are not textually similar are less likely to get hashed to the same bucket.

Therefore, the blocking of the plurality of documents is performed based on textual similarity as the documents with similar content are likely to belong to the same real-world entity. For example, if attributes, such as a name, an address, and a phone number are same in two documents, there might be a possibility that the two documents are related to the same person. Similarly, if the name is same in two documents whereas the address and the phone number differ, the possibility of the two documents being related to the same person is relatively lesser. Therefore, in case two documents A and B have a large number of words in common, the documents A and B may be considered for further comparisons as compared to a pair of documents, which may vary textually.

In one implementation, the blocking module 120 may hash potentially matching documents with the same value and therefore, may block the potentially matching documents hashed with the same value in the same bucket. In one implementation, each bucket may be understood as a key-value pair. The key may be understood as a corresponding bucket-ID, and value is a group of documents, which may get hashed to this 'key'. Therefore, once the blocking module 120 may hash each of the plurality of documents to their respective bucket IDs, each bucket may contain documents with high textual similarity.

In one implementation, the blocking module 120 may allot a unique identification (ID) to each of the plurality of documents, and may maintain an ID file mapping record IDs to the corresponding documents. In such an implementation, in order to reduce data traffic, instead of blocking the plurality of documents themselves, the blocking module 120 may block unique IDs of the documents into the at least one bucket. Further, in the course of blocking the document IDs, one or more singleton buckets may also be formed. Singleton buckets can be understood as buckets including one document ID. The blocking module 120 may discard such singleton buckets. The blocking of the plurality of documents may facilitate in avoiding unnecessary comparisons among the plurality of documents. Further, removal of singleton buckets may assist in reducing time to be utilized, resource consumption, and cost associated with transmission of textual documents to singleton buckets at subsequent stages of the ER analysis. In one implementation, the details pertaining to the blocking module 120 may be stored in the blocking data 128.

Thereafter, the graph generation module 122 may generate a graph depicting the plurality of documents and the at least one bucket as vertices. For example, the graph may include a vertex, hereinafter referred to as record vertex, for each of the plurality of documents. Similarly, the graph may include a vertex, hereinafter referred to as bucket vertex, for each of the at least one bucket. Further, the plurality of record vertices and the at least one bucket vertex may be connected to each other based on the blocking of the plurality of documents into the at least one bucket. For example, if a document is blocked in a bucket, then an edge may exist between a corresponding record vertex and a corresponding bucket vertex. Such edges are bidirectional, i.e., if an edge exists from a record vertex A to a bucket vertex B, then another edge exists from the bucket vertex B to the record vertex A.

Following the creation of the graph, the graph generation module 122 may generate an adjacency list for each record vertex and each bucket vertex. In one example, an adjacency list of a record vertex, hereinafter referred to as record adjacency list, may include details of bucket vertices to which the record vertex is hashed to. On the other hand, an adjacency list of a bucket vertex, hereinafter referred to as bucket adjacency list, may include details of record vertices hashed to the bucket vertex. In one implementation, the details pertaining to the graph generation module 122 may be stored in the blocking data 128.

In one implementation, the computation module 124 may provide a notification to a user for selecting at least one of Bucket-Centric Parallelization (BCP) technique and a Record-Centric Parallelization (RCP) technique for resolving entities from the plurality of documents. Further, the notification may include but is not limited to a suggestion for selecting one of the BCP technique and the RCP technique for resolving the entities from the plurality of documents. In one implementation, the computation module 124 may provide the suggestion based on the blocking of the plurality of documents. For example, in case the blocking of the plurality of documents may result into substantially uniform distribution of the plurality of documents among the buckets, the computation module 124 may provide the suggestion to select the BCP technique. On the other hand, in case the plurality of documents is distributed among the buckets in a non-uniform manner, then the computation module 124 may provide the suggestion to select the RCP technique for entity resolution. In one implementation, the computation module 124 may define a threshold to set a degree of non-uniformity, above which the RCP technique may be suggested for entity resolution.

In one implementation, the BCP technique and the RCP technique may be employed using a Pregel-based platform. In another implementation, Apache Giraph APACHE GIRAPH™ is the Pregel-based platform to be used for employing the abovementioned techniques. As is generally understood, APACHE GIRAPH™ is an iterative graph processing system built for high scalability, and an open source implementation of Pregel.

In one implementation, in response to the notification, the computation module 124 may receive an instruction from the user to implement the BCP technique for the entity resolution. In order to provide a better clarity and understanding of the present subject matter, FIG. 1(a) illustrates an example with a plurality of documents and buckets. The example is cited to provide a better understanding of the present subject matter, and therefore, should not be construed as limiting. Further, it would be better to refer to FIG. 1(a) in conjunction with the description of FIG. 1.

In accordance with the cited example, there are four documents $r_1$, $r_2$, $r_3$, and $r_4$ such that all the four documents belong to the same entity $r_{1234}$, and two buckets $b_1$ and $b_2$. Continuing with the present implementation, the computation module 124 provide a value of each of the plurality of record vertices to one or more bucket vertices connected to the record vertex, based on a corresponding adjacency list of the record vertex. The value of a record vertex may include but is not limited to content of a corresponding document of the record vertex.

In the present example, the computation module 124 may provide a value of the record vertex $r_2$ to the bucket vertex $b_1$ and the bucket vertex $b_2$. Once, each bucket vertex may receive values of the record vertices hashed to the bucket vertex, the computation module 124 may compare the corresponding documents at each bucket vertex. In one implementation, the computation module 124 may utilize an Iterative Match Merge (IMM) technique for comparing the documents at each bucket vertex. In another implementation, the computation module 124 may employ an R-swoosh based IMM technique for performing the comparison.

In one implementation, the computation module 124 may consider two documents as "Matching" if the two documents may return a value, e.g., "True" under some match function. In one implementation, a match function may be a Boolean function defined over two documents that may return "True", when the two documents are determined to be belonging to the same entity. On the other hand, in case the two documents may return a value "False", the two documents are determined to be not-matching. Further, the match functions can be implemented in multiple ways, e.g., as pre-defined rules or as Machine Learning based classifiers. In one implementation, a match function may be based on at least one rule defined over attribute values of the two documents being compared. For example, a match function may be defined that the two documents may return "True", if (name matches) AND (address matches) AND (date-of-birth matches). Otherwise, the two documents may return "False".

In one implementation, in accordance with the R-Swoosh based IMM technique, within a bucket, the computation module 124 may divide the documents into two sets, e.g., a set X and a set Y. The set X may contain all the documents from a bucket, and the set Y may contain the documents, which may already have been compared with each other. As would be gathered, at the starting of the execution of the IMM technique, the set Y may be empty. In such an implementation, the computation module 124 may, at each bucket vertex, compare two documents to start the execution of the IMM technique. Once, the set Y may include at least one document which is compared with at least one of the documents from the bucket, the computation module 124 may iterate over each of the documents in the set X. For example, the computation module 124 may remove a document D from the set X, and may then compare the document D with each document available in the set Y. In case the document D may not have a matching document in the set Y, the computation module 124 may add the document D to the set Y.

On the other hand, if the document D may have a matching document P in the set Y, then the computation module 124 may remove the document P from the set Y. In continuation to the removal of the document P from the set Y, the computation module 124 may merge the document D and the document P to create a merged document DP. Further, the computation module 124 may add the merged document DP to the set X. As would be gathered, although the document D may not match any other document in the set Y, the merged document DP may match a document in the set Y. Therefore, by the end of the IMM process, the set X may be empty, and the set Y may contain the final result of the IMM process, i.e., the merged documents corresponding to a plurality of entities. As would be gathered, in each bucket, the computation module 124 may create a merged document for each entity. The merged document of an entity may contain all the information as disclosed in each of the documents, at each bucket vertex, pertaining to the entity. In other words, at each bucket vertex, the computation module 124 may resolve the documents to entities. The entities resolved from the documents at each bucket vertex are referred to as partial entities.

As per the IMM technique, multiple partial entities belonging to the same entity can be obtained at multiple bucket vertices. However, such partial entities may share at least one document or at least one corresponding record vertex, and therefore, can be considered to be connected. In order to determine such shared or common or connected documents, the computation module 124, for each partial entity, may select one of the record vertices as a central record vertex. Further, the computation module 124 may create a bi-directional edge between the central record vertex and each of the remaining record vertices of the partial entity. Therefore, the computation module 124 connects the record vertices involved in a partial entity to each other through the central record vertex.

The computation module 124 may create similar vertex-edge structures for each partial entity. In case a document or a corresponding record vertex is shared by multiple partial entities, the corresponding record vertex may appear in the vertex-edge structure of each of the multiple partial entities. In such an implementation, record vertices belonging to the two partial entities may be connected and may be considered to be belonging to the same entity. Further, the computation module 124 may provide a connected component ID (CCID) to each of the connected record vertices. The CCID is indicative of the entity a record vertex is resolved to. Subsequent to the determination of the connected components, the computation module 124 may consolidate documents corresponding to the connected record vertices to form an entity-resolved document for the entity. As would be gathered, an entity-resolved document of an entity may include all the information pertaining to the entity as disclosed in each of the plurality of documents.

For the example cited in FIG. 1(*a*), the computation module 124 may merge documents corresponding to the record vertices $r_1$, $r_2$, and $r_4$ to give a partial-entity $r_{124}$ at the bucket vertex $b_1$. Further, for the partial entity $r_{124}$, the computation module 124 may select the record vertex $r_1$ as a central record, and therefore, may create a bi-directional edge between the record vertex $r_1$ and each of the record vertex $r_2$ and the record vertex $r_4$. Similarly, at the bucket-vertex $b_2$, the computation module 124 may merge documents corresponding to the record vertex $r_2$ and the record vertex $r_3$ to create a merged document and therefore, a partial-entity $r_{23}$. Further, the computation module 124 may create a bi-directional edge between the record vertex $r_2$ and the record vertex $r_3$. As would be gathered, the computation module 124 may determine a connected component including the record vertices $r_1$, $r_2$, $r_3$ and $r_4$. Based on the determination, the computation module 124 may consolidate the documents pertaining to the record vertices $r_1$, $r_2$, $r_3$ and $r_4$ to create a resolved entity document $r_{1234}$, which corresponds to an entity.

In an alternate implementation, in response to the notification, the computation module 124 may receive an instruction from the user for implementing the RCP technique for entity resolution. In order to provide a better clarity and understanding of the present subject matter, FIG. 1(*b*) illustrates an example of entity resolution from the plurality of documents using the RCP technique. As would be noticed, for an ease of understanding, the example cited in FIG. 1(*b*) is same as that of the FIG. 1(*a*). The example is cited to provide a better understanding of the present subject matter, and therefore, should not be construed as limiting. Further, it would be better to refer to FIG. 1(*b*) in conjunction with the description of FIG. 1.

In the RCP technique, the computation module 124, from each bucket vertex, may provide a comparison message to one or more record vertices connected to a bucket vertex, in order to schedule comparisons among the plurality of documents using the IMM technique. For example, for each pair of record vertices from a set of record vertices connected to the bucket, the computation module 124 may provide a comparison message to one of the two record vertices, e.g., ID $\{r_j\}$ of a record vertex $r_j$ may be provided to a record vertex $r_i$, if i<j. Otherwise, the computation module 124 may provide the comparison message $\{r_i\}$ to the record vertex $r_j$.

In another example, if a bucket adjacency list of a bucket vertex includes k record vertices $r_1, r_2, \ldots, r_k$, then the computation module 124 may provide the record vertex $r_1$ with comparison messages $\{r_2, \ldots r_k\}$. Similarly, the computation module 124 may provide the record vertex $r_2$ with comparison messages $\{r_3, \ldots, r_k\}$. In one implementation, a pair of documents may co-exist in multiple buckets. In other words, a pair of corresponding record vertices may be connected to multiple bucket vertices. In such an implementation, the computation module 124 may provide multiple comparison messages, one from each of the multiple buckets, to the same record vertex, e.g., the record vertex with lower ID. With reference to the example cited in FIG. 1(b), for the bucket vertex $b_1$, the computation module 124 may send a comparison message $\{r_2, r_4\}$ and $\{r_4\}$ to the record vertex $r_1$ and the record vertex $r_2$, respectively. Similarly, for the bucket vertex $b_2$, the computation module 124 may send a comparison message $\{r_3\}$ to the record vertex $r_2$.

Once a record vertex may receive one or more comparison messages, the record vertex may become active. In continuation to the receipt of one or more comparison messages by the record vertex, the computation module 124 may send a value of the record vertex to record vertices whose IDs are received in the comparison message. In one implementation, a pair of record vertices $r_i$ and $r_j$ may be connected to multiple bucket vertices, and therefore the record vertex $r_i$ may receive multiple comparison messages with an ID of the record vertex $r_j$. However, the computation module 124 may send a value of the record vertex $r_i$ to the record vertex $r_j$ once. With regard to the example cited in FIG. 1(b), the computation module 124 may provide a value of the record-vertex $r_1$ to the record vertex $r_2$ and the record vertex $r_4$, based on the comparison messages received from the bucket vertex $b_1$. Similarly, the computation module 124 may provide a value of the record vertex $r_2$ to the record vertex $r_3$ and the record vertex $r_4$, based on the comparison messages received from the bucket vertex $b_2$ and the bucket vertex $b_1$, respectively.

Based on the comparison messages, the computation module 124 may compare the plurality of record vertices using a match function. In one implementation, the match function may include but is not limited to pre-defined rules and Machine Learning based classifiers. For example, if a value of a record vertex r matches a value of an incoming comparison message containing an ID of a record vertex r', the computation module 124 may deliver a match message $\{r, r'\}$ containing IDs of the two matched record vertices to the record vertex r and the record vertex r'. With reference to the example cited in FIG. 1(a), at the record vertex $r_2$, the computation module 124 may compare the values of the record vertex $r_1$ and the record vertex $r_2$. In one implementation, the computation module 124 may determine the record vertex $r_1$ and the record vertex $r_2$ to be matching, and therefore, may provide a match message $\{r_1, r_2\}$ to the record vertex $r_1$ and the record vertex $r_2$. Similarly, at the record vertex $r_3$, the computation module 124 may provide a match message $\{r_2, r_3\}$ to the record vertex $r_2$ and the record vertex $r_3$. Further, at the record vertex $r_4$, the computation module 124 may generate match messages $\{r_1, r_4\}$ and $\{r_2, r_4\}$. The computation module 124 may provide the match message $\{r_1, r_4\}$ to the record vertex $r_1$ and the record vertex $r_4$. Similarly, the match message $\{r_2, r_4\}$ may be provided to the record vertex $r_2$ and the record vertex $r_4$.

As mentioned earlier, if a document corresponding to the record vertex $r_i$ matches m documents corresponding to m record vertices, the record vertex $r_i$ may receive m corresponding match messages. Now, as the record vertex $r_i$ matches the m record vertices, the m+1 (including r) documents may considered to be belonging to the same entity. In such an implementation, at the record-vertex the computation module 124 may consolidate the pairs of record IDs received as match messages to create a match set containing the m+1 IDs. Therefore, a match set is indicative of a set including IDs of record vertices belonging to the same entity. In one implementation, the computation module 124 may provide the match set to one or more bucket-vertices as defined in the bucket adjacency list of the record-vertex $r_i$. With reference to the example cited in FIG. 1(b), the computation module 124, at the record vertex $r_1$, may consolidate match messages $\{r_1, r_2\}$ and $\{r_1, r_4\}$ to create a match set $\{r_1, r_2, r_4\}$. The match set $\{r_1, r_2, r_4\}$ may further be provided to the bucket vertex $b_1$. Similarly, at the record vertex $r_2$, the computation module 124 may consolidate the match messages $\{r_1, r_2\}, \{r_2, r_3\}$ and $\{r_2, r_4\}$ to create a match set $\{r_1, r_2, r_3, r_4\}$ for further forwarding to the bucket vertex $b_1$ and the bucket vertex $b_2$. Further, at the record vertex $r_3$, the computation module 124 may send a match set $\{r_2, r_3\}$ to the bucket vertex $b_2$. Furthermore, at the record vertex $r_4$, the computation module 124 may forward a match set $\{r_1, r_2, r_4\}$ to the bucket vertex $b_1$.

Upon receiving the match sets from connected record vertices, at each bucket-vertex, the computation module 124 may consolidate the match sets, and may create new record IDs accordingly. For example, in case any two match sets $M_i$ and $M_j$ received by a bucket vertex may include a common document ID, i.e., $M_i \cap M_j = \emptyset$, the computation module 124 may consolidate the IDs of the match sets. As a result, the computation module 124 may create a new consolidated set $M_{ij} = M_i \cup M_j$, and upon creation of the new consolidated set, may delete the match sets $M_i$ and $M_j$. In one implementation, the computation module 124 may create the consolidated set till all the match sets are disjoint.

Further, the computation module 124 may create a record vertex for each disjoint consolidated set. Such record vertices may be referred to as partial entity vertices. In one implementation, the computation module 124 may create bi-directional edges between the partial entity vertices and the corresponding buckets vertices. Further, IDs of the partial entity vertices are allotted based on the consolidated sets $M_{ij}$. Therefore, even if a partial entity is created from multiple buckets, a corresponding partial entity vertex may be created once. In one implementation, the computation module 124 may provide a partial-entity ID message to each of the record vertex the partial entity is connected to.

Figure 1B:
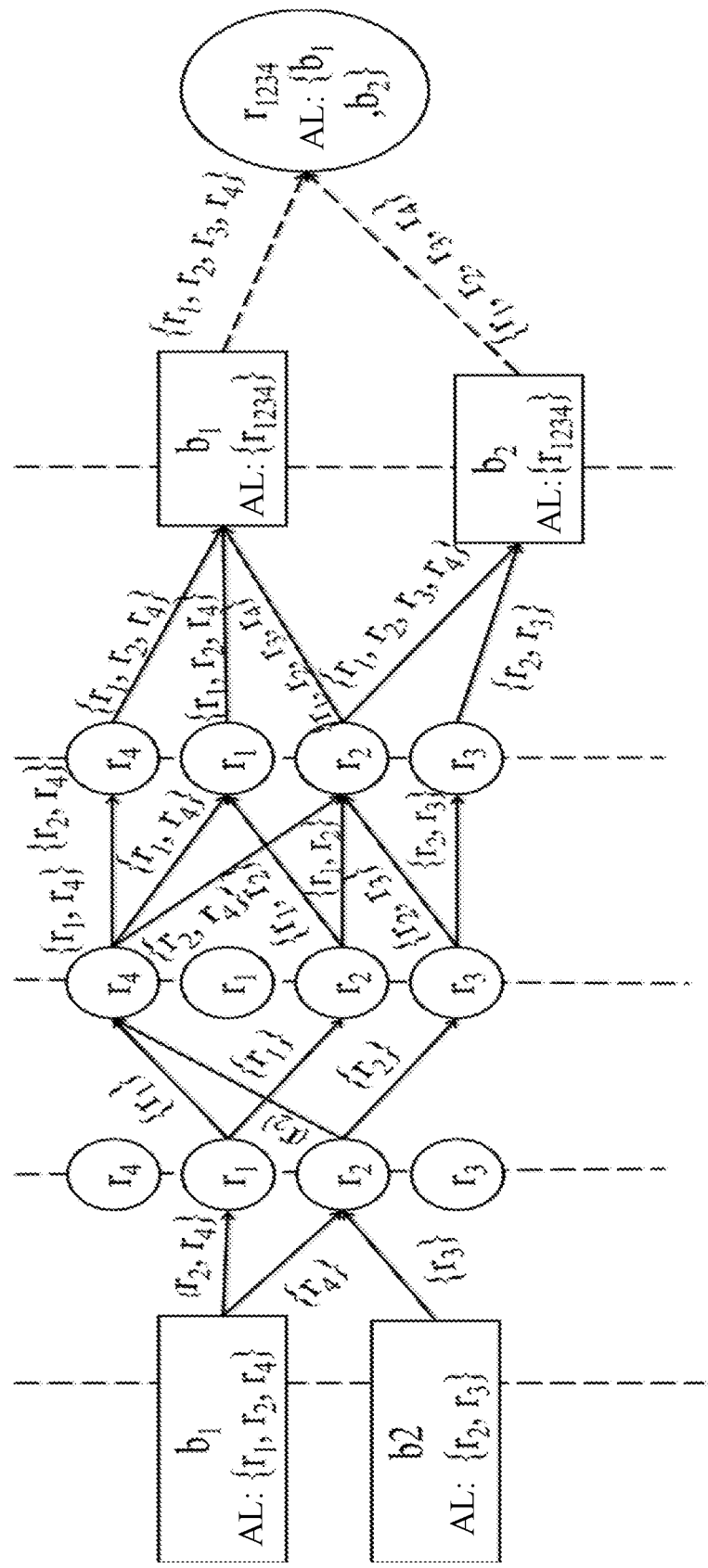
FIG. 1(b) illustrates an outcome of entity resolution from a plurality of documents by executing Record-Centric Parallelization (RCP) technique for entity resolution, in accordance with an embodiment of the present subject matter.

With reference to the example cited in FIG. 1(b), the computation module 124 may provide the bucket vertex $b_1$ with the match sets $\{r_1, r_2, r_4\}, \{r_1, r_2, r_3, r_4\}$ and $\{r_1, r_2, r_4\}$, which may then be consolidated to get a consolidated set $\{r_1, r_2, r_3, r_4\}$. Accordingly, the computation module 124 may create a partial-entity-vertex with ID $r_{1234}$. Similarly, the computation module 124 may provide the bucket vertex $b_2$ with match sets $\{r_1, r_2, r_3, r_4\}$ and $\{r_2, r_3\}$, which may then be consolidated to get $\{r_1, r_2, r_3, r_4\}$. The computation module 124 may further create a corresponding partial entity vertex with ID $r_{1234}$. As would be noticed, the computation module 124 may create the same partial entity vertex for the bucket vertex $b_1$ and the bucket vertex $b_2$. Further, the computation module 124 may create a bi-directional edge between $r_{1234}$ and each of the bucket vertex $b_1$ and the bucket vertex $b_2$. In one implementation, the computation module 124 may provide partial-entity ID message with the ID $r_{1234}$ to the corresponding record vertices connected to each of the bucket vertex $b_1$ and the bucket vertex $b_2$.

In one implementation, upon receiving a partial-entity ID message including the ID of a new partial-entity vertex $r_{PE}$, the computation module 124 may provide the value and the record adjacency list of the record $r_i$ as a message, e.g., $\{v_i, e_i\}$ to the partial-entity vertex $r_{PE}$. The $v_i$ and $e_i$ may be understood as the value and the record adjacency list of the record vertex $r_i$. With reference to the example cited in FIG. 1(b), the computation module 124 may provide messages $\{v_1, e_1\}$, $\{v_2, e_2\}$, $\{v_3, e_3\}$, and $\{v_4, e_4\}$ to the partial entity vertex $r_{1234}$, from the record vertices $r_1$, $r_2$, $r_3$ and $r_4$, respectively.

Subsequent to the receipt of values of the connected record vertices, the computation module 124 may merge the received values $v_i$s as received in the messages to create the value of the partial-entity vertex $r_{PE}$. In one implementation, for every bucket vertex $b_i$, to which the partial-entity record vertex $r_{PE}$ is added, the computation module 124 may compare the partial-entity record vertex $r_{PE}$ with the other documents and partial entities in a bucket adjacency list of $b_i$. In one implementation, the partial-entity vertices may be treated like record vertices for next iteration of the above-mentioned steps. Finally, the computation module 124 may delete each record vertex, which formed the partial-entity vertex $r_{PE}$.

With reference to the example cited in the FIG. 1(b), the computation module 124 may provide the values of the record vertices $r_1$, $r_2$, $r_3$ and $r_4$ to the partial entity vertex $r_{1234}$ in order to update the corresponding value. Further, the computation module 124 may create bi-directional edges between the partial entity vertex $r_{1234}$ and each of the bucket vertex $b_1$ and the bucket vertex $b_2$. In one implementation, the computation module 124 may delete the record vertices $r_1$, $r_2$, $r_3$ and $r_4$.

As mentioned earlier, initially, all the bucket-vertices were active, i.e., were involved in the ER analysis. However, in the subsequent iterations of the RCP technique, bucket-vertices that receive messages from the final stages of the RCP technique may remain active. Such iterations may continue until no more final messages are generated.

In one implementation, each bucket vertex may have old as well as new document IDs in a corresponding adjacency list at the end of an iteration of the abovementioned steps. The computation module 124 may not compare documents pertaining to a bucket vertex, which may have been already compared. In order to avoid such comparisons, the computation module 124 may maintain a set P for each bucket-vertex, which may contain the pairs of document IDs which have already been compared in previous iterations.

For example, a bucket b may include 4 documents, namely $r_1$, $r_2$, $r_3$ and $r_4$ in a corresponding bucket adjacency list. In one implementation, as a result of a first iteration of abovementioned sequence of steps, the document $r_1$ and the document $r_2$ may get merged to form a new record $r_{12}$. In such an implementation, the bucket adjacency list of the bucket b may be $\{r_{12}, r_3, r_4\}$, and the set P may include $\{\{r_1, r_2\}, \{r_1, r_3\}, \{r_1, r_4\}, \{r_2, r_4\}, \{r_3, r_4\}\}$. Therefore, in the next iteration of the abovementioned sequence of steps, the computation module 124 may compare pairs, namely $\{\{r_{12}, r_3\}, \{r_{12}, r_4\}\}$. With reference to the FIG. 1(b), the bucket vertices $b_1$ and $b_2$ may have one document ID, i.e., $\{r_{1234}\}$ in their respective bucket adjacency lists. Therefore, in the present example, the computation module 124 may not perform further comparisons, and terminate the ER analysis. In one implementation, details pertaining to the computation module 124 may be stored in the computation data 130.

Figure 2:
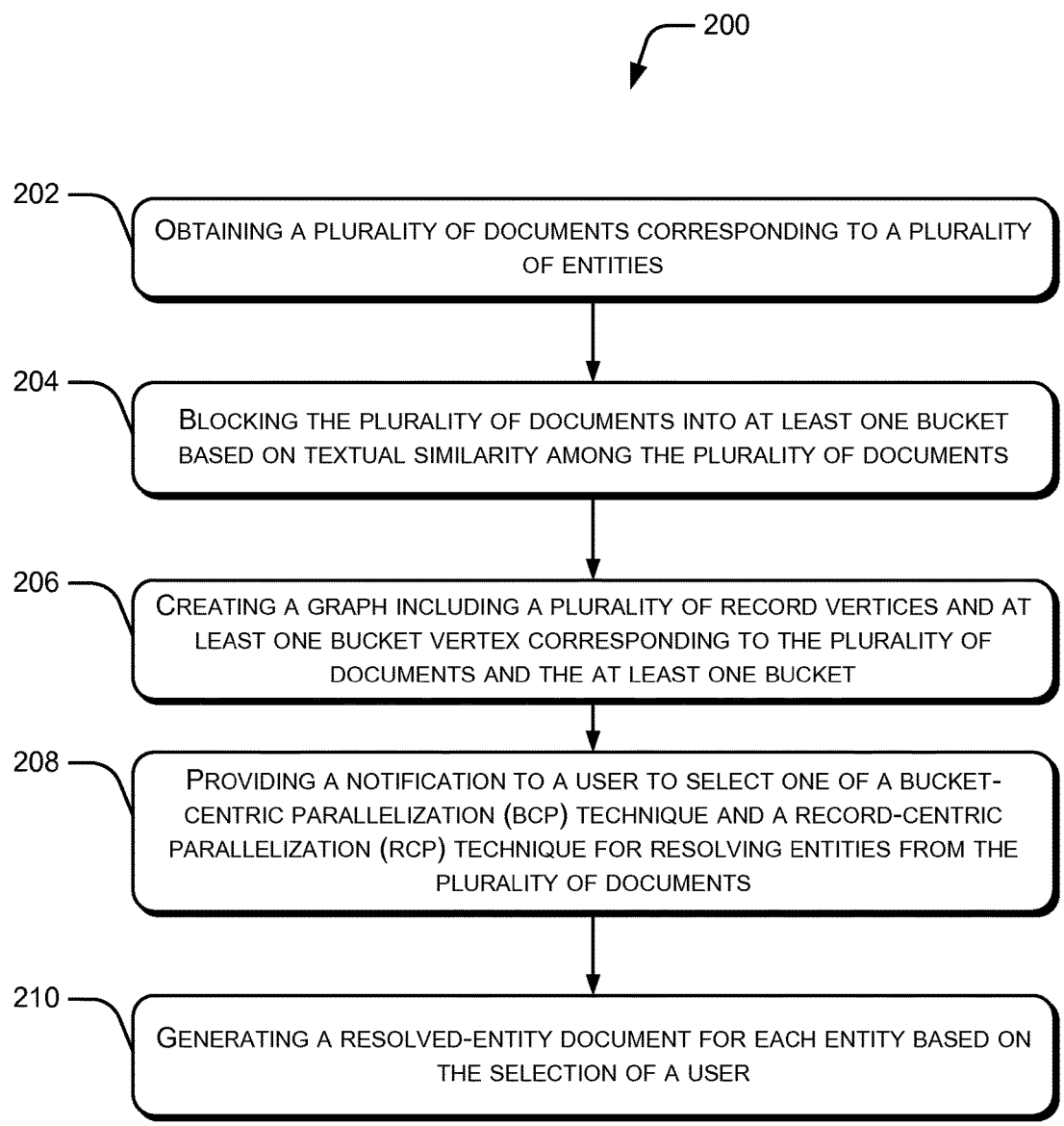
FIG. 2 illustrates a method for entity resolution from a plurality of documents, in accordance with an embodiment of the present subject matter.

FIG. 2 illustrates a method 200 for entity resolution from a plurality of documents, according to one embodiment of the present subject matter. The method 200 may be implemented in a variety of computing systems in several different ways. For example, the method 200, described herein, may be implemented using an entity resolution system 102, as described above.

The method 200, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 200.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 200 is described with reference to the system 102, the description may be extended to other systems as well.

With reference to the description of FIG. 2, for the sake of brevity, the details of the components of the entity resolution system 102 are not discussed here. Such details can be understood as provided in the description provided with reference to FIG. 1.

The method 200 may provide an entity resolution from a plurality of documents. At block 202, a plurality of documents corresponding to a plurality of entities may be obtained from at least one data source. In one implementation, the plurality of documents may be documents. In one implementation, the blocking module 120 of the entity resolution system 102 may obtain the plurality of documents.

Following the obtaining of the plurality of documents, at block 204, the plurality of documents may be blocked into at least one bucket based on textual similarity. In one implementation, a blocking technique known as Locality Sensitive Hashing (LSH) may be adopted for blocking the plurality of documents into the at least one bucket. The LSH technique may use hash functions for grouping or blocking the plurality of documents based on textual similarity among the plurality of documents. In one implementation, the plurality of documents may be hashed with bucket IDs. Therefore, the documents which are determined to be textually similar can be grouped in the same bucket. In one implementation, the blocking module 120 of the entity resolution system 102 may block the plurality of documents into one or more buckets.

At block 206, a graph may be created including a plurality of record vertices and at least one bucket vertex. The plurality of record vertices and the at least one bucket vertex may correspond to the plurality of documents and the at least one bucket, respectively. In one implementation, based on the blocking of the plurality of documents, the plurality of record vertices and the at least one bucket vertex may be connected to each other by edges. In one implementation, the graph generation module 122 of the entity resolution system 102 may create the graph.

At block 208, a notification may be provided to a user for selecting one of a Bucket-Centric Parallelization (BCP) technique and a Record-Centric Parallelization (RCP) technique for resolving entities from the graph. In one implementation, the notification may include a suggestion to select one of the BCP technique and the RCP technique, based on the blocking of the plurality of documents. In one implementation, the BCP technique and the RCP technique may be employed using a Pregel-based platform. In the BCP technique, an Iterative Match Merge (IMM) technique may be employed at each bucket vertex.

In accordance with the BCP technique, a value of each record vertex may be provided to one or more bucket vertices based on an adjacency list of a record vertex. The adjacency list of the record vertex is indicative of a list of bucket vertices the record vertex is blocked to. Further, the value of a record vertex may include a document corresponding to the record vertex. In one implementation, at each bucket vertex, a merged document may be created for each entity based on IMM technique. The IMM technique may identify, from the plurality of documents, at least one matching pair of documents and merges the at least one matching pair of documents to create the merged document for each entity.

On the other hand, in the RCP technique, a match function may be utilized at each record vertex. In other words, instead of comparing the documents at the bucket vertices, the comparison of documents is distributed among the record vertices. In accordance with the RCP technique, a comparison message may be provided to each of the plurality of record vertices to schedule comparisons among the plurality of documents corresponding to the record vertices. A comparison message sent to a record vertex may include IDs of documents to be compared with a document corresponding to the record vertex. Further, a value of the record vertex may be sent to record vertices whose IDs are received by the record vertex in the comparison message.

In one implementation, a match message may be delivered to each of a pair of record vertices based on matching of a pair of documents corresponding to the pair of record vertices, wherein the match message includes an ID of each of the pair of record vertices. Continuing with the present implementation, at each record vertex, IDs of the record vertices received as one or more match messages may be consolidated to create a match set, wherein the match set is indicative of a set including IDs of record vertices belonging to the same entity. Further, at each bucket vertex, the one or more match sets received from the record vertices blocked in a bucket vertex may be combined to create a merged document for each entity. In one implementation, a computation module 124 of the entity resolution system 102 may provide the notification to a user to select one of the BCP technique and the RCP technique for entity resolution.

At block 210, a resolved entity document for each entity may be generated based on the selection of a user. Therefore, the entities are resolved from the plurality of documents. In one implementation, the computation module 124 of the entity resolution system 102 may generate a resolved entity document for each entity.

Although implementations of a method for resolving entities from a plurality of documents have been described in language specific to structural features and/or methods, it is to be understood that the present subject matter is not necessarily limited to the specific features or methods described.

We claim:

1. A method for resolving entities from a plurality of documents, the method comprising:
   obtaining, by a processor, the plurality of documents, corresponding to a plurality of entities, from at least one data source, and assigning a unique identification (ID) to each of the plurality of documents;
   blocking, by the processor, the plurality of documents into a plurality of buckets based on textual similarity by providing the unique IDs of the plurality of documents to the plurality of buckets instead of blocking the plurality of documents themselves;
   discarding one or more singleton buckets having only one document;
   creating, by the processor, a graph including a plurality of record vertices and a plurality of bucket vertices, wherein the plurality of record vertices and the plurality of bucket vertices are indicative of the plurality of documents and the plurality of buckets, respectively, wherein each of the plurality of documents and the plurality of buckets are indicated as a vertex in the graph, and the plurality of record vertices and the plurality of bucket vertices are connected to each other by edges, depending on the blocking of the plurality of documents, wherein each of the edges between the record vertices and the bucket vertices are bi-directional;
   creating an adjacency list for each record vertex and each bucket vertex, wherein the adjacency list of the record vertex includes information of bucket vertices to which the record vertex hashed to, and an adjacency list of the bucket vertex includes information of record vertices hashed to the bucket vertex,
   selecting one of a Bucket-Centric Parallelization (BCP) technique and a Record-Centric Parallelization (RCP) technique for resolving entities from the plurality of documents based on the blocking of the plurality of documents into the plurality of buckets, wherein the Bucket-Centric Parallelization (BCP) technique is selected when the blocking of the plurality of documents into the plurality of buckets is uniform and the Record-Centric Parallelization (RCP) technique is selected when the blocking of the plurality of documents into the plurality of buckets is non-uniform, wherein the RCP technique utilizes less time than the BCP technique for entity resolution in a case of a non-uniform distribution of the plurality of documents in the plurality of buckets, wherein in the BCP and RCP techniques, the record vertices and the bucket vertices are communicating with each other in a distributed computing setting via message passing, and the bucket vertices and the record vertices are distributed across multiple processors, and wherein the BCP technique comprises:
   providing, by the processor, a value of each record vertex to one or more bucket vertices based on the adjacency list of a record vertex, wherein the adjacency list of the record vertex is indicative of a list of bucket vertices the record vertex is blocked to, and the value includes a document content corresponding to each record vertex;

receiving the document content of the record vertices hashed to each bucket vertex at each bucket vertex and creating, by the processor, at each bucket vertex, a merged document for each entity based on an Iterative Match-Merge (IMM) technique, wherein at each bucket vertex, from the plurality of documents available at each bucket vertex, at least one matching pair of documents is identified and the at least one matching pair of documents is merged to create the merged document for each entity termed as a 'partial entity' at each bucket vertex, wherein a set of partial entities are created at each bucket vertex;

obtaining a plurality of partial entities from the sets of partial entities, belonging to the same entity from the plurality of bucket vertices, wherein the plurality of partial entities belonging to the same entity share at least one record vertex and thereby the plurality of partial entities are connected to each other, wherein one or more connected record vertices are identified by, selecting, for each partial entity, one of the record vertices as a central record vertex, creating a bi-directional edge between the central record vertex and each of the remaining record vertices of the partial entity, thereby connecting the record vertices involved in each of the partial entity to each other through the central record vertex; and identifying the one or more connected record vertices, wherein the record vertices belonging to two or more partial entities are connected and considered to be belonging to the same entity;

providing a connected component ID (CCID) to each of the connected record vertices, wherein the CCID is indicative of the entity to which the record vertex is resolved; and generating, by the processor, a resolved entity-document for each entity by consolidating the merged documents corresponding to the connected record vertices pertaining to each entity from each bucket; and wherein the RCP technique comprises handling the non-uniform distribution of the records at the plurality of buckets by performing the iterative match merge computation for the records mapped to the same bucket back to the record vertices themselves to achieve parallelization of load of IMM computations of the records vertices, wherein the RCP technique comprises:

a) providing, from each bucket vertex, by the processor, a comparison message to each of the plurality of record vertices hashed to the corresponding bucket vertex to schedule comparisons among the plurality of documents corresponding to the record vertices, wherein the comparison message sent to a record vertex includes the IDs of the documents to be compared with a document corresponding to the record vertex, wherein each record vertex becomes active after receiving the comparison message;

b) sending, by the processor, a value of the record vertex to the record vertices whose IDs are received by the record vertex in the comparison message, wherein the value includes the document of the record vertex;

c) delivering, by the processor, a match message to each of a pair of record vertices based on matching of a pair of documents corresponding to the pair of record vertices, wherein the match message includes the IDs of each of the pair of record vertices;

d) consolidating, by the processor, at each record vertex, the IDs of the record vertices received as one or more match messages to create a match set, wherein the match set is indicative of a set including IDs of record vertices belonging to the same entity and sending one or more match sets to the corresponding bucket vertices;

e) upon receiving the one or more match sets of connected record vertices, combining, by the processor, at each bucket vertex, the one or more match sets received from the record vertices blocked in the bucket vertex by consolidating IDs of the match sets to create a new consolidated set, wherein the consolidated sets are created until all of the match sets are disjoint;

f) creating a record vertex for each disjoint consolidated set referred to as partial entity vertices, and creating bi-directional edges between the partial entity vertices and the corresponding buckets vertices and providing a partial-entity ID message to each of the record vertex the partial entity vertex is connected to;

g) upon receiving the partial-entity ID message including the ID of the partial entity vertex, providing the value and the record adjacency list of the record vertex as a message to the partial entity vertex; and upon receiving the values of the connected record vertices, merging the received values to create the value of the partial entity vertex; and creating bi-directional edges between the partial entity vertex and each of the corresponding bucket vertices and deleting the corresponding record vertices;

iterating the steps 'd' to 'g' until no match messages generated by treating the partial entity vertices as new record vertices, wherein already compared documents are not compared again in next iterations;

generating, by the processor, a resolved entity-document for each entity by consolidating the merged documents pertaining to each entity from each bucket; and thereby generating, by the processor, the resolved entity-document for each entity, based on the selected technique.

2. The method as claimed in claim 1, wherein the BCP technique and the RCP technique are executed on a graph-parallel Pregel-based platform.

3. The method as claimed in claim 1, wherein the textually similar documents are blocked using a Locality Sensitive Hashing (LSH) technique.

4. An entity resolution system for entity resolution from a plurality of documents, the entity resolution system comprising:

a processor;

a blocking module, coupled to the processor, to:
obtain the plurality of documents corresponding to a plurality of entities, from at least one data source, and assign a unique identification (ID) to each of the plurality of documents; and block the plurality of documents into a plurality of buckets based on textual similarity by providing the unique IDs of the plurality of documents to the plurality of buckets instead of blocking the plurality of documents themselves;

discard one or more singleton buckets having only one document a graph generation module, coupled to the processor, to:

create a graph including a plurality of record vertices and a plurality of bucket vertices, wherein the plurality of record vertices and the plurality of bucket vertices are indicative of the plurality of documents and the plurality of buckets, respectively, and wherein each of the plurality of documents and the plurality of buckets are indicated as a vertex in the graph, and the plurality of record vertices and the plurality of bucket vertices are connected to each other by edges, depending on the blocking of the plurality of documents, wherein each of the edges between the record vertices and the bucket vertices are bi-directional;

create an adjacency list for each record vertex and each bucket vertex, wherein the adjacency list of the record vertex includes information of bucket vertices to which the record vertex hashed to, and the adjacency list of the bucket vertex includes information of record vertices hashed to the bucket vertex; and a computation module, coupled to the processor, to:

select one of a Bucket-Centric Parallelization (BCP) technique and a Record-Centric Parallelization (RCP) technique, for resolving entities from the plurality of documents based on the blocking of the plurality of documents into the plurality of buckets, wherein the Bucket-Centric Parallelization (BCP) technique is selected when the blocking of the plurality of documents into the plurality of buckets is uniform and the Record-Centric Parallelization (RCP) technique is selected when the blocking of the plurality of documents into the plurality of buckets is non-uniform, wherein the RCP technique utilizes less time than the BCP technique for entity resolution in case of a non-uniform distribution of the plurality of documents in the plurality of buckets, wherein in the BCP and RCP techniques, the record vertices and the bucket vertices are communicating with each other in a distributed computing setting via message passing, and the bucket vertices and the record vertices are distributed across multiple processors;

receive an instruction indicative of selection of the BCP technique for resolving entities from the plurality of documents, wherein to execute the BCP technique, the computation module is coupled to the processor, to:

provide a value of each record vertex to one or more bucket vertices based on the adjacency list of a record vertex, wherein the adjacency list of the record vertex is indicative of a list of bucket vertices the record vertex is blocked to, and the value includes a document corresponding to each record vertex;

receive the document content of the record vertices hashed to each bucket vertex at each bucket vertex and create at each bucket vertex, a merged document for each entity based on an Iterative Match-Merge (IMM) technique, wherein at each bucket vertex, from the plurality of documents available at each bucket vertex, at least one matching pair of documents is identified and the at least one matching pair of documents is merged to create the merged document for each entity termed as a 'partial entity' at each bucket vertex, wherein a set of partial entities are created at each bucket vertex;

obtain a plurality of partial entities from the sets of partial entities, belonging to the same entity from the plurality of bucket vertices, wherein the plurality of partial entities belonging to the same entity share at least one record vertex and thereby the plurality of partial entities are connected to each other, wherein one or more connected record vertices are identified by, select for each partial entity, one of the record vertices as a central record vertex, create a bi-directional edge between the central record vertex and each of the remaining record vertices of the partial entity, thereby connect the record vertices involved in each of the partial entity to each other through the central record vertex; and identify the one or more connected record vertices, wherein the record vertices belonging to two or more partial entities are connected and considered to be belonging to the same entity;

provide a connected component ID (CCID) to each of the connected record vertices, wherein the CCID is indicative of the entity to which the record vertex is resolved; and generate a resolved entity-document for each entity by consolidating the merged documents corresponding to the connected record vertices pertaining to each entity from each bucket; and the RCP technique comprises handling a non-uniform distribution of the records at the plurality of buckets by performing the iterative match merge computation for the records mapped to the same bucket back to the record vertices themselves to achieve parallelization of load of IMM computations of the records vertices, wherein to execute the RCP technique, the computation module, coupled to the processor, to:

a) provide from each bucket vertex, a comparison message to each of the plurality of record vertices hashed to the corresponding bucket vertex to schedule comparisons among the plurality of documents corresponding to the record vertices, wherein the comparison message sent to a record vertex includes the IDs of the documents to be compared with a document corresponding to the record vertex, wherein each record vertex becomes active after receiving the comparison message;

b) send a value of the record vertex to the record vertices whose IDs are received by the record vertex in the comparison message, wherein the value includes the document of the record vertex;

c) deliver a match message to each of a pair of record vertices based on matching of a pair of documents corresponding to the pair of record vertices, wherein the match message includes the IDs of each of the pair of record vertices;

d) consolidate at each record vertex, the IDs of the record vertices received as one or more match messages to create a match set, wherein the match set is indicative of a set including IDs of record vertices belonging to the same entity and send one or more match sets to the corresponding bucket vertices;

e) upon receiving the one or more match sets of connected record vertices, combine at each bucket vertex, the one or more match sets received from the record vertices blocked in the bucket vertex, by consolidating IDs of the match sets to create a new consolidated set, wherein the consolidated sets are created until all of the match sets are disjoint;

f) create a record vertex for each disjoint consolidated set referred to as partial entity vertices, and create bi-directional edges between the partial entity vertices and the corresponding buckets vertices and provide a partial-entity ID message to each of the record vertex the partial entity vertex is connected to;

g) upon receiving the partial-entity ID message including the ID of the partial entity vertex provide the value and the record adjacency list of the record vertex as a message to the partial entity vertex; and upon receiving the values of the connected record vertices, merge the received values to create the value of the partial entity vertex; and create bi-directional edges between the partial entity vertex and each of the corresponding bucket vertices and deleting the corresponding record vertices;

iterate the steps 'd' to 'g' until no match messages generated by treating the partial entity vertices as new record vertices, wherein already compared record documents are not compared again in next iterations; and generate a resolved entity-document for each entity by consolidating the merged documents pertaining to each entity from each bucket; and thereby generate the resolved entity-document for each entity, based on the selected technique.

5. The entity resolution system as claimed in claim 4, wherein the BCP technique and the RCP technique are executed on a graph-parallel Pregel-based platform.

6. The entity resolution system as claimed in claim 4, wherein the blocking module blocks textually similar documents using a Locality Sensitive Hashing (LSH) technique.

7. A non-transitory computer-readable medium having embodied thereon a computer program for executing a method resolving entities from a plurality of documents, the method comprising:

obtaining, by a processor, the plurality of documents corresponding to a plurality of entities, from at least one data source, and assigning a unique identification (ID) to each of the plurality of documents;

blocking, by the processor, the plurality of documents into a plurality of buckets based on textual similarity by providing the unique IDs of the plurality of documents to the plurality of buckets instead of blocking the plurality of documents themselves;

discarding one or more singleton buckets having only one document;

creating, by the processor, a graph including a plurality of record vertices and a plurality of bucket vertices, wherein the plurality of record vertices and the plurality of bucket vertices are indicative of the plurality of documents and the plurality of buckets, respectively, and wherein each of the plurality of documents and the plurality of buckets are indicated as a vertex in the graph, and the plurality of record vertices and the plurality of bucket vertices are connected to each other by edges, depending on the blocking of the plurality of documents, wherein each of the edges between the record vertices and the bucket vertices are bi-directional;

create an adjacency list for each record vertex and each bucket vertex, wherein the adjacency list of the record vertex included information of bucket vertices to which the record vertex hashed to, and the adjacency list of the bucket vertex includes information of record vertices hashed to the bucket vertex;

select one of a Bucket-Centric Parallelization (BCP) technique and a Record-Centric Parallelization (RCP) technique for resolving entities from the plurality of documents based on the blocking of the plurality of documents into the plurality of buckets, wherein the Bucket-Centric Parallelization (BCP) technique is selected when the blocking of the plurality of documents into the plurality of buckets is uniform and the Record-Centric Parallelization (RCP) technique is selected when the blocking of the plurality of documents into the plurality of buckets is non-uniform, wherein the RCP technique utilizes less time than the BCP technique for entity resolution in case of a non-uniform distribution of the plurality of documents in the plurality of buckets, wherein in the BCP and RCP technique, the record vertices and the bucket vertices are communicating with each other in a distributed computing setting via message passing, and the bucket vertices and the record vertices are distributed across multiple processors, wherein the BCP technique comprises:

providing, by the processor, a value of each record vertex to one or more bucket vertices based on the adjacency list of a record vertex, wherein the adjacency list of the record vertex is indicative of a list of bucket vertices the record vertex is blocked to, and the value includes a document content corresponding to each record vertex;

receiving the document content of the record vertices hashed to each bucket vertex at each bucket vertex and creating, by the processor, at each bucket vertex, a merged document for each entity based on an Iterative Match-Merge (IMM) technique, wherein at each bucket vertex, from the plurality of documents available at each bucket vertex, at least one matching pair of documents is identified and the at least one matching pair of documents is merged to create the merged document for each entity termed as a 'partial entity' at each bucket vertex, wherein a set of partial entities are created at each bucket vertex;

obtaining a plurality of partial entities from the sets of partial entities, belonging to the same entity from the plurality of bucket vertices, wherein the plurality of partial entities belonging to the same entity share at least one record vertex and thereby the plurality of partial entities are connected to each other, wherein one or more connected record vertices are identified by, selecting, for each partial entity, one of the record vertices as a central record vertex, creating a bi-directional edge between the central record vertex and each of the remaining record vertices of the partial entity, thereby connecting the record vertices involved in each of the partial entity to each other through the central record vertex; and identifying the one or more connected record vertices, wherein the record vertices belonging to two or more partial entities are connected and considered to be belonging to the same entity, providing a connected component ID (CCID) to each of the connected record vertices, wherein the CCID is indicative of the entity to which the record vertex is resolved, and generating, by the processor, a resolved entity-document for each entity by consolidating the merged documents corresponding to the connected record vertices pertaining to each entity from each bucket; and wherein the RCP technique comprises handling the non-uniform distribution of the records at the plurality of buckets by performing the iterative match merge computation for the records mapped to the same bucket back to the record vertices themselves to achieve parallelization of load of IMM computations of the records vertices, wherein the RCP technique comprises:

a) providing, from each bucket vertex, by the processor, a comparison message to each of the plurality of record vertices hashed to the corresponding bucket vertex to schedule comparisons among the plurality of documents corresponding to the record vertices, wherein the comparison message sent to a record vertex includes the IDs of the documents to be compared with a document corresponding to the record vertex, wherein each record vertex becomes active after receiving the comparison message;

b) sending, by the processor, a value of the record vertex to the record vertices whose IDs are received by the record vertex in the comparison message, wherein the value includes the document of the record vertex;

c) delivering, by the processor, a match message to each of a pair of record vertices based on matching of a pair of documents corresponding to the pair of record vertices, wherein the match message includes the IDs of each of the pair of record vertices;

d) consolidating, by the processor, at each record vertex, the IDs of the record vertices received as one or more match messages to create a match set, wherein the match set is indicative of a set including IDs of record vertices belonging to the same entity and sending one or more match sets to the corresponding bucket vertices;

e) upon receiving the one or more match sets of connected record vertices, combining, by the processor, at each bucket vertex, the one or more match sets received from the record vertices blocked in the bucket vertex by consolidating IDs of the match sets to create a new consolidated set, wherein the consolidated sets are created until all of the match sets are disjoint;

f) creating a record vertex for each disjoint consolidated set referred as a partial entity vertices, and creating bi-directional edges between the partial entity vertices and the corresponding buckets vertices and provide a partial-entity ID message to each of the record vertex the partial entity vertex is connected to;

g) upon receiving the partial-entity ID message including the ID of the partial entity vertex, providing the value and the record adjacency list of the record vertex as a message to the partial entity vertex; and upon receiving the values of the connected record vertices, merging the received values to create the value of the partial entity vertex; and creating bi-directional edges between the partial entity vertex and each of the corresponding bucket vertices and deleting the corresponding record vertices;

iterating the steps 'd' to 'g' until no match messages generated by treating the partial entity vertices as new record vertices, wherein already compared record documents are not compared again in next iterations;

generating, by the processor, a resolved entity-document for each entity by consolidating the merged documents pertaining to each entity from each bucket; and thereby generating, by the processor, the resolved entity-document for each entity, based on the selected technique.

* * * * *